United States Patent
Newhard (10) Patent No.: US 6,550,801 B1
(45) Date of Patent: Apr. 22, 2003

(54) ADJUSTABLE CABLE COMPENSATING KNUCKLE FOR A STROLLER

(75) Inventor: Daniel N. Newhard, Lititz, PA (US)

(73) Assignee: Graco Children's Products Inc., Exton, PA (US)

(*) Notice: Subject to any disclaimer, the term of this patent is extended or adjusted under 35 U.S.C. 154(b) by 42 days.

(21) Appl. No.: 09/969,162

(22) Filed: Oct. 3, 2001

(51) Int. Cl.[7] ................................................. B62B 1/00
(52) U.S. Cl. .................. 280/642; 280/47.371; 280/650; 280/655.1; 403/97
(58) Field of Search .......................... 280/47.371, 47.38, 280/87.051, 642, 647, 650, 655.1, 657, 658; 403/93, 96, 97, 99, 101, 104, 108, 322.3; 16/111.1, 113.1, 233, 436

(56) References Cited

U.S. PATENT DOCUMENTS

| | | | |
|---|---|---|---|
| 1,697,710 A | * 1/1929 | Bostroem | 403/97 |
| 2,255,262 A | * 9/1941 | MacFadden | 285/185 |
| 4,880,015 A | * 11/1989 | Nierman | 600/564 |
| 4,953,887 A | 9/1990 | Takahashi et al. | |
| 4,979,794 A | * 12/1990 | Evans | 385/109 |
| 5,013,125 A | * 5/1991 | Nilsson et al. | 385/137 |
| 5,039,118 A | * 8/1991 | Huang | 280/47.371 |
| 5,056,805 A | 10/1991 | Wang | |
| 5,168,601 A | * 12/1992 | Liu | 16/445 |
| 5,181,735 A | 1/1993 | Onishi | |
| 5,184,835 A | 2/1993 | Huang | |
| 5,358,352 A | * 10/1994 | Klarhorst | 403/104 |
| 5,454,584 A | 10/1995 | Haut et al. | |
| 5,511,441 A | 4/1996 | Arai | |
| 5,524,503 A | * 6/1996 | Ishikura | 74/501.6 |
| 5,535,483 A | * 7/1996 | Cabagnero | 16/429 |
| 5,538,214 A | * 7/1996 | Sinila | 248/278.1 |
| 5,769,447 A | * 6/1998 | Huang | 280/642 |
| 5,775,718 A | 7/1998 | Huang | |
| 5,779,209 A | * 7/1998 | Rello | 248/278.1 |
| 6,068,284 A | 5/2000 | Kakuda | |
| 6,116,624 A | * 9/2000 | Hu | 280/47.371 |
| 6,155,740 A | 12/2000 | Hartenstine | |
| 6,322,098 B1 | * 11/2001 | Lan | 280/642 |
| 6,478,327 B1 | * 11/2002 | Hartenstine et al. | 280/642 |
| 6,503,018 | * 1/2003 | Hou et al. | 403/97 |

* cited by examiner

Primary Examiner—Brian L. Johnson
Assistant Examiner—Christopher Bottorff
(74) Attorney, Agent, or Firm—Foley & Lardner (57) ABSTRACT

An adjustable knuckle has a first knuckle member having a first cable guide and a second knuckle member having a second cable guide. The second knuckle member is rotatable relative to the first knuckle member so that a plurality of angular positions can be established between the first and second knuckle members. First and second cable slack absorption members, such as pulleys, are disposed on the first knuckle member in first and second predetermined positions. The first and second cable slack absorption members are located and dimensioned so that a cable, passing from the first cable guide to the second cable guide, wraps thereon when an angle between the first knuckle member and the second knuckle member changes from a first angle, at which the cable passes between the first and second cable absorption members with a minimum of deflection by either of the first and second cable absorption members, to a second angle.

16 Claims, 10 Drawing Sheets

ADJUSTABLE CABLE COMPENSATING KNUCKLE FOR A STROLLER

FIELD OF THE INVENTION

The present invention relates generally to an adjustable knuckle apparatus for a stroller or carriage. More specifically, the present invention relates a cable-compensating adjustable knuckle that can be used in connection with a pivotal or foldable handle of a stroller or carriage.

BACKGROUND OF THE INVENTION

Foldable strollers are well known in the art. Foldable strollers, such as disclosed in U.S. Pat. No. 6,155,740 to Hartenstine and U.S. Pat. No. 6,068,284 to Kakuda, both incorporated herein by reference, have a stroller frame that allows the stroller to fold from an extended (use) configuration to a collapsed (stow) configuration. These foldable strollers typically have left- and right-side fold mechanisms, also known as hinge locks, that allow the stroller to collapse from the extended configuration to the collapsed configuration. U.S. Pat. No. 5,454,584 to Haut et al., incorporated herein by reference, discloses details of suitable fold mechanisms that can be used on such a foldable stroller.

In many folding strollers, the operator needs to use both hands to unlock the two lock mechanisms. Using both hands can be cumbersome and inconvenient, particularly when only one hand is free. In addition, because the lock mechanisms are located between the push arms of the stroller and the stroller's front legs, the operator must walk to the front of the stroller and lean over to grasp and pull the fold mechanisms to effect collapse of the stroller. The need to lean over to reach the fold mechanisms can be uncomfortable to operators suffering from back stress.

To alleviate some of these problems, U.S. Pat. No. 6,068,284 to Kakuda discloses a one-hand-fold actuator conveniently located at the center of the handle bar. The one-hand-fold actuator makes it simple and easy for an operator to simultaneously unlock the fold mechanisms using only one hand. The actuator is wired via a pair of cables to lock mechanisms on either side of the stroller, one cable per side. Upon actuation, the actuator simultaneously pulls the cables, which pass through the tubular members of the handle bar, to release both lock mechanisms.

Another feature that is desirable on stroller is a handle bar that can be adjusted to suit the height and stance of the stroller operator. Examples of such arrangements are found in U.S. Pat. No. 5,184,835 to Huang and U.S. Pat. No. 5,056,805 to Wang. Including such an adjustable handlebar, however, makes it difficult to provide a fold actuator on the handle bar when the cables, which are used to operate the lock mechanism, are required to pass through the tubular handle bar and push arms, as in the case of the arrangement disclosed in U.S. Pat. No. 6,068,284.

SUMMARY OF THE INVENTION

Accordingly, there is a need for a stroller with an adjustable handle bar and a remote fold actuator, where cabling between the fold actuator and the fold mechanisms do not interfere with, or impede, the handle bar adjustment mechanism.

The present invention provides an adjustable knuckle comprising a first knuckle member having a first cable guide and a second knuckle member having a second cable guide. The second knuckle member is rotatable relative to the first knuckle member so that a plurality of angular positions can be established between the first and second knuckle members. The adjustable knuckle further comprises first and second cable slack absorption members disposed on the first knuckle member in first and second predetermined positions. The first and second cable slack absorption members are located and dimensioned so that a cable, passing from the first cable guide to the second cable guide, wraps thereon when an angle between the first knuckle member and the second knuckle member changes from a first angle, at which the cable passes between the first and second cable absorption members with a minimum of deflection by either of the first and second cable absorption members, to a second angle.

In this arrangement, the first and second slack absorption members can comprise first and second pulleys which are rotatably supported on the first knuckle member in the first and second predetermined positions, respectively. The first and second pulleys each have a periphery about which the cable wraps when the angle between the first knuckle member and the second knuckle member changes from the first angle to the second angle.

A second aspect of the invention resides in a stroller comprising a handle bar; a push arm; a lock element disposed in the push arm; a manually operable actuator disposed in the handle bar; a knuckle interconnecting the handle bar and the push arm; a cable interconnecting the manually operable actuator and the lock element; and first and second cable slack absorption members disposed on the knuckle. The knuckle permits angular adjustment of the handle bar with respect to the push arm. The cable passes through a portion of the knuckle and through the push arm. In addition, the cable has a length selected to permit an operative connection between the manually operable actuator and the lock element and to be essentially equal to a maximum path length between the manually operable device and the lock mechanism, which occurs when an angle between the handle bar and the push arm assumes a maximum path length angle. The first and second cable slack absorption members are arranged so that, when the handle bar and the push arm are angled at the maximum path length angle, the cable passes between the first and second slack absorption members with the minimum amount of deflection and so that, as the angle between the handle bar and the push arm changes from the maximum path angle, the amount of cable engaging a periphery of one of the cable slack absorption members increases. No cable slack occurs due to the increased engagement of the cable by the cable slack absorption member.

A further aspect of the invention resides in a method of assembly of a stroller handle having a handle bar and a push bar connected by a knuckle which allows the angle of the handle bar to be selectively adjusted with respect to the push bar. The method comprises providing a manually operable actuator on the handle bar, the actuator including a cable; feeding the cable through cable guides formed in the knuckle so that the cable passes between a pair of slack absorption members in the knuckle; connecting an end of the cable to a lock element; disposing a pair of tongs through a hollow of a push arm so that gripping elements of the tongs protrude out through a first end of the push arm; gripping the lock element with the gripping elements of the tongs; pulling the lock element into the hollow of the push arm using the tongs; inserting the push arm into a socket formed in a knuckle; and pulling the tongs out of the push arm until a portion of the lock element protrudes from a second end of the push arm.

Another aspect of the invention relates to an adjustable knuckle comprising a first knuckle member having a first cable guide and a second knuckle member having a second cable guide. The second knuckle member is rotatable relative to the first knuckle member so that a plurality of angular positions can be established between the first and second knuckle members. The adjustable knuckle also comprises first and second cable slack absorption members disposed on the first knuckle member in first and second predetermined positions. The first and second cable slack absorption members are located and dimensioned so that a cable, passing from the first cable guide to the second cable guide, passes between the first and second cable slack absorption members.

BRIEF DESCRIPTION OF THE DRAWINGS

The various merits and advantages of the present invention will become more clearly appreciated as a detailed description of the preferred embodiments of the invention are given with reference to the appended drawings in which.

DETAILED DESCRIPTION OF THE PREFERRED EMBODIMENTS

Figure 1:
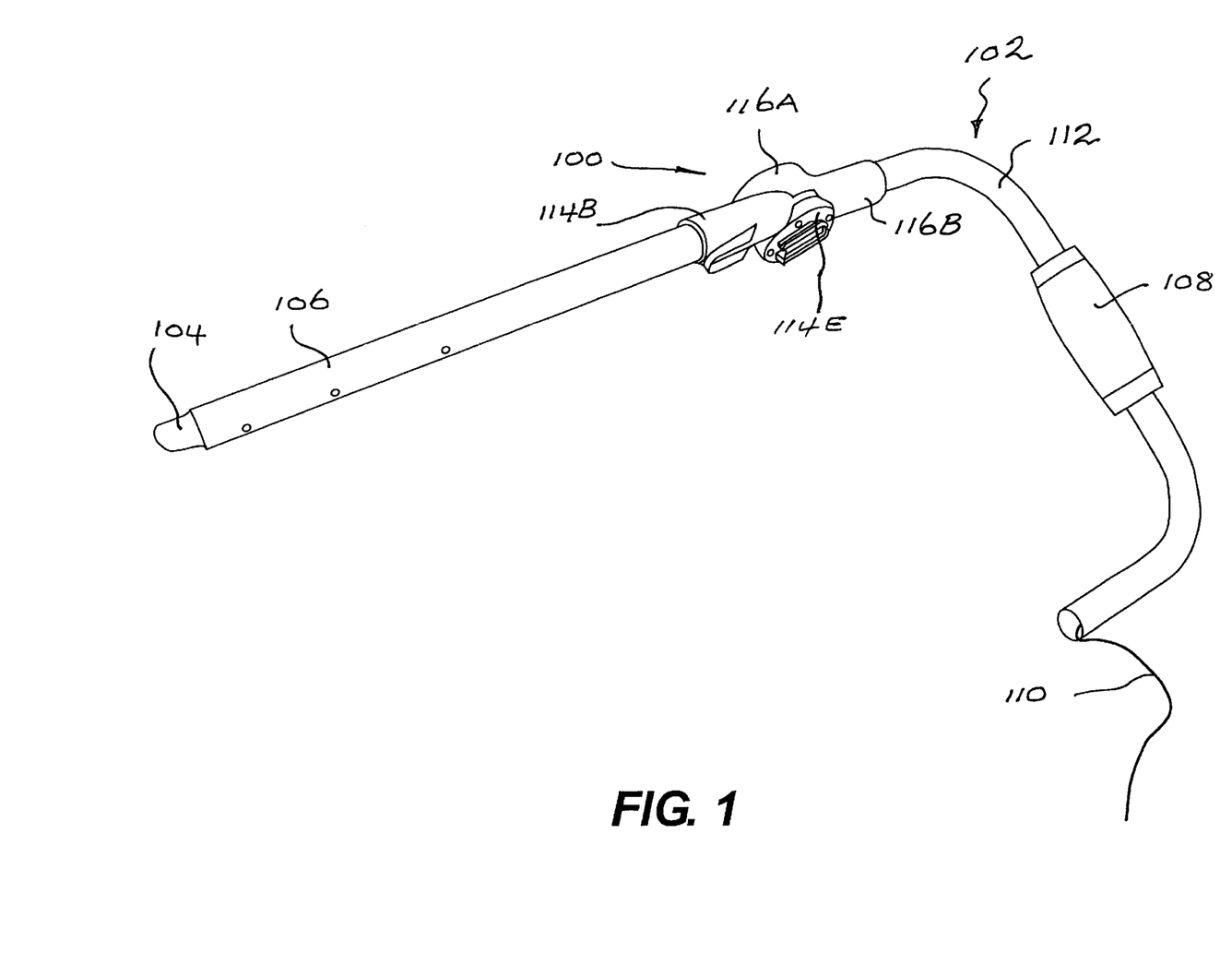
FIG. 1 is a perspective view of features of a stroller, showing an adjustable knuckle located between a push bar and a handle bar of the stroller.

FIG. 1 shows the use of an adjustable knuckle 100 according the present invention for adjustment of the handle bar of a foldable stroller relative to the push arms of the stroller. The adjustable knuckle 100 enables a cable 110, which is associated with an unlocking and fold mechanism of the stroller, to pass therethrough, and the knuckle 100 appropriately absorbs slack produced in the cable 110 as the knuckle 100 is bent and straightened out during pivoting of the handle bar 112 with respect to the push arms 106 of the stroller.

According to the present invention, a knuckle or knuckle-type joint, which allows angular adjustment of a stroller handle bar with respect to the stroller's push arms, is interposed between a lock element 104 of a stroller fold mechanism and a manually operable fold actuator, such as actuator 108 in FIG. 1. The actuator cables 110 pass through the interior of each knuckle 100, thus concealing the cables completely within the tubular handle bars, push arms, and knuckles. Passing the cables 110 through the knuckle 100 presented challenges. That is, as the knuckle 100 articulates to fold the handle bar, the length of the cable path between the actuator 108 and the fold mechanism changes and reaches a maximum at a given angle between the handle bar 112 and push arm 106. Thus, a given amount of cable must be provided to enable the knuckle 100 to bend past the angle at which a maximum amount of cable is required. In other words, at a given angle, the length of the path along which the cable must run from the manually operable actuator 108 to the lock element 104 reaches a maximum. This angle will be referred to as the maximum path length angle. When the angle between the handle bar 112 and the push arm 106 changes from the "maximum path length angle," i.e., when the angle between the handle bar 112 and the push arm 106 increases or decreases on either side of this "maximum path length angle," the cable path length decreases. This produces slack in the cable. Slack in the cable renders it difficult to assure proper operation of the lock element 104, irrespective of the angle at which the handle bar 112 is set via adjustment of the knuckle 100.

In accordance with an embodiment of the invention, in order to avoid cable slack, while still providing an adequate length of cable to allow articulation of the knuckle between a straight condition and a fully bent condition, two slack control members, which can be in the form of a pair of rollers or pulleys, are provided. The cable passes between the two pulleys, as will be described below. When the knuckle is bent to the maximum path length angle, requiring the maximum amount of cable, the cable has little or no contact with either pulley. However, as the knuckle angle increases or decreases with respect to this maximum path length angle, the cable begins to wind about one or both of the two pulleys, which thus consumes slack as it is produced.

Figure 3A:
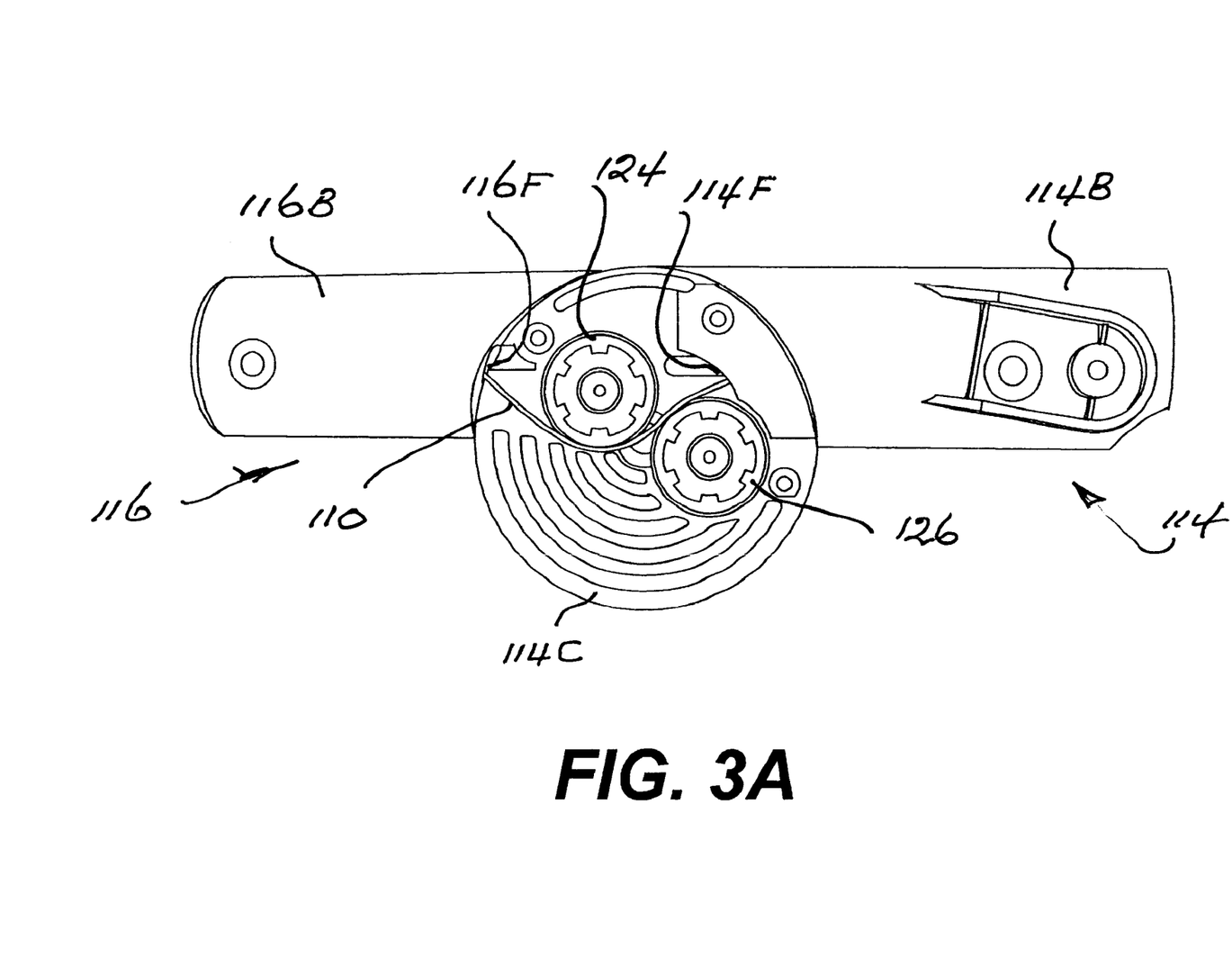
FIGS. 3A–3E are side elevation views of an inboard side of the knuckle, showing the interaction between pulleys and a cable that extends between a manually operable fold actuator on the handle bar and a lock element of a lock mechanism, where the pulleys enable an appropriate length of cable to be provided through the knuckle and absorb cable slack as it is produced at a plurality of different knuckle articulation angles.
Figure 3B:
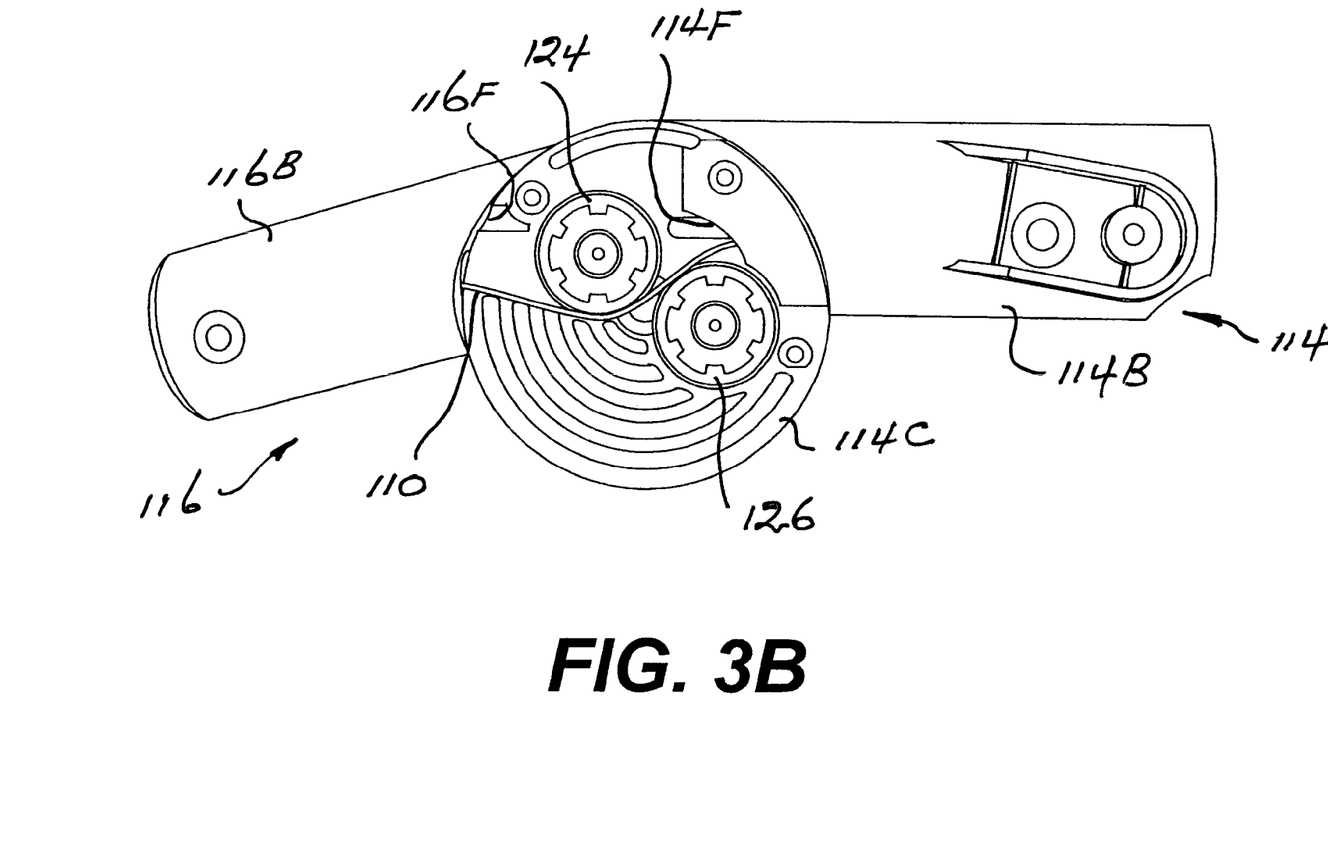
Figure 3C:
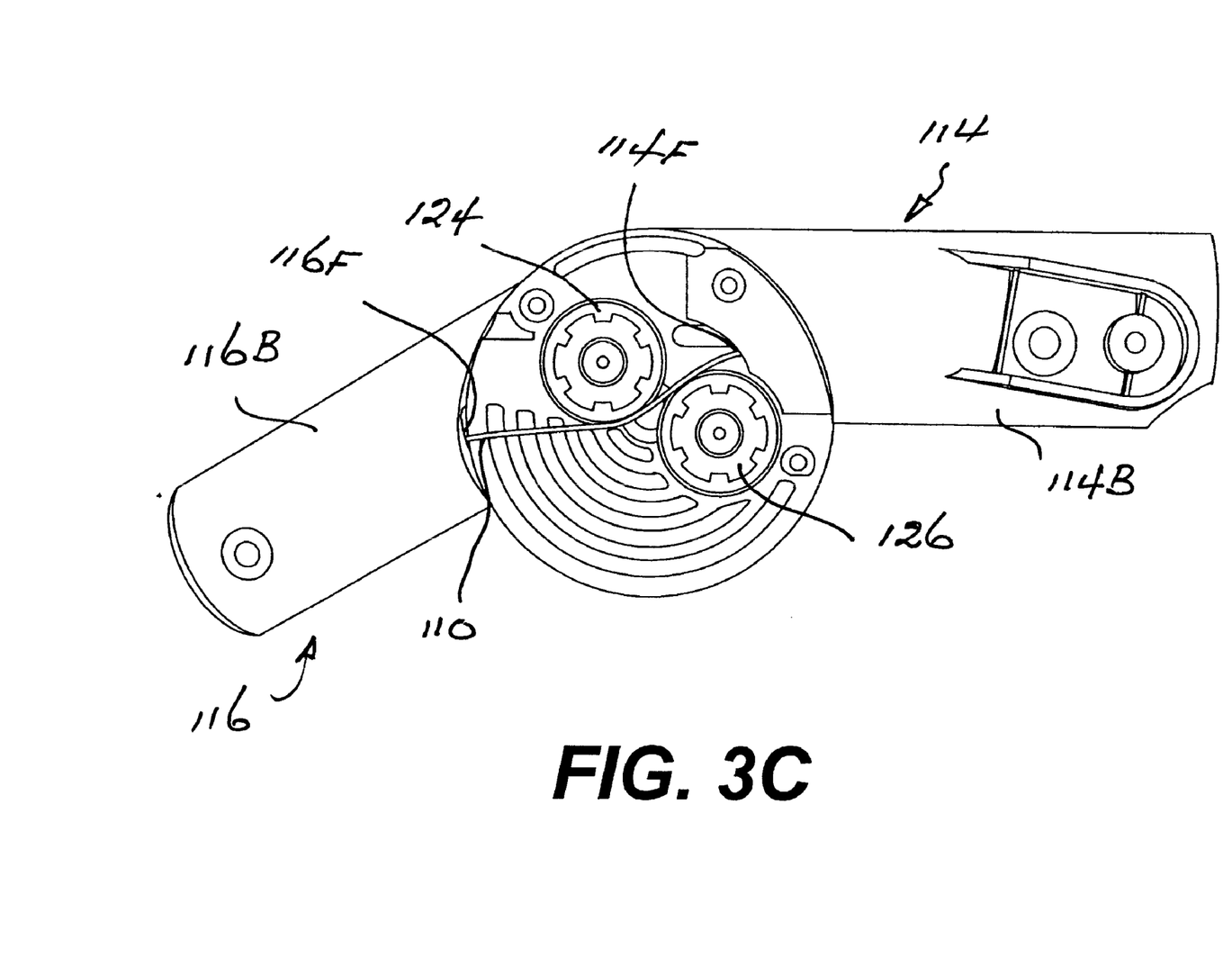
Figure 3D:
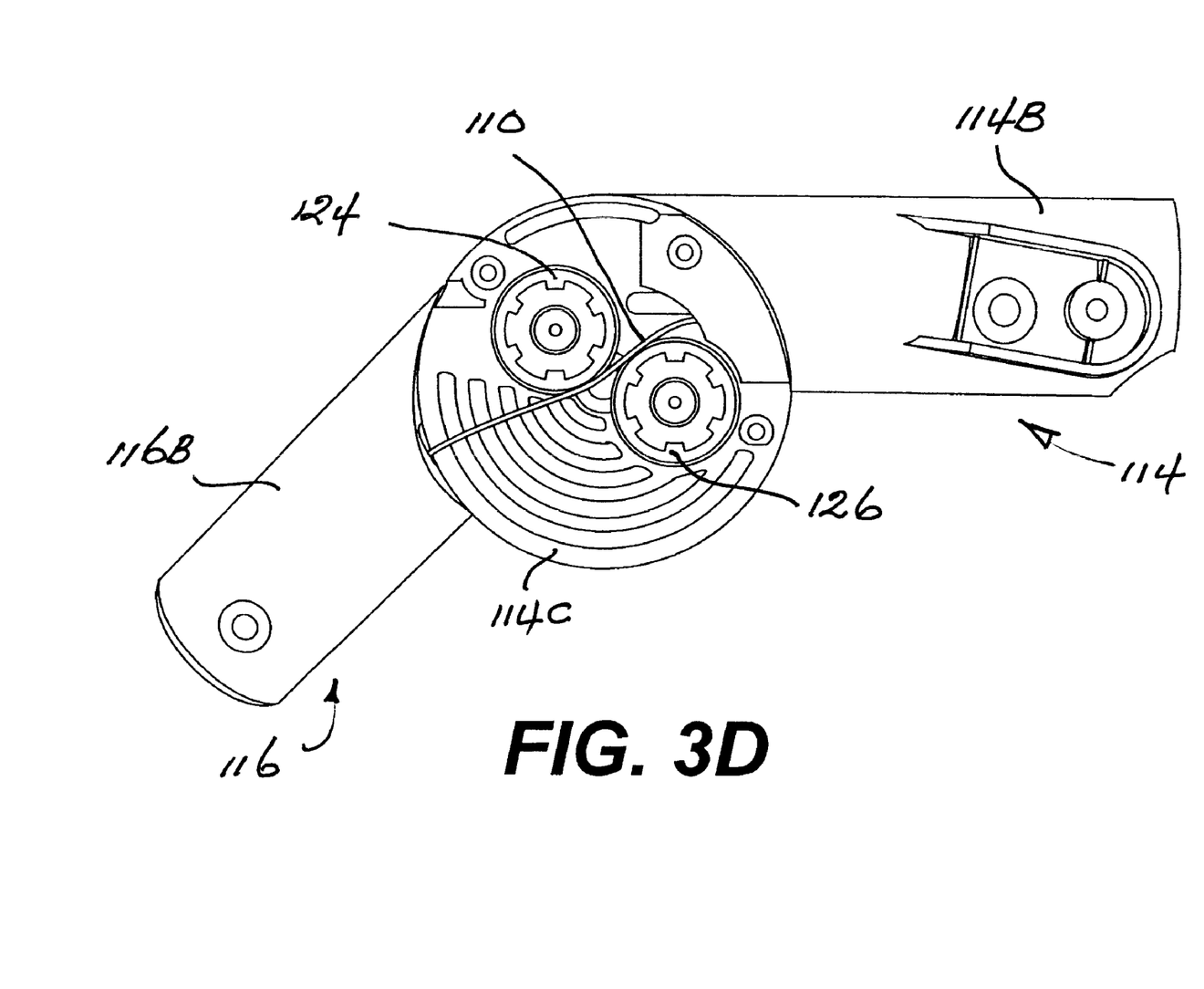
Figure 3E:
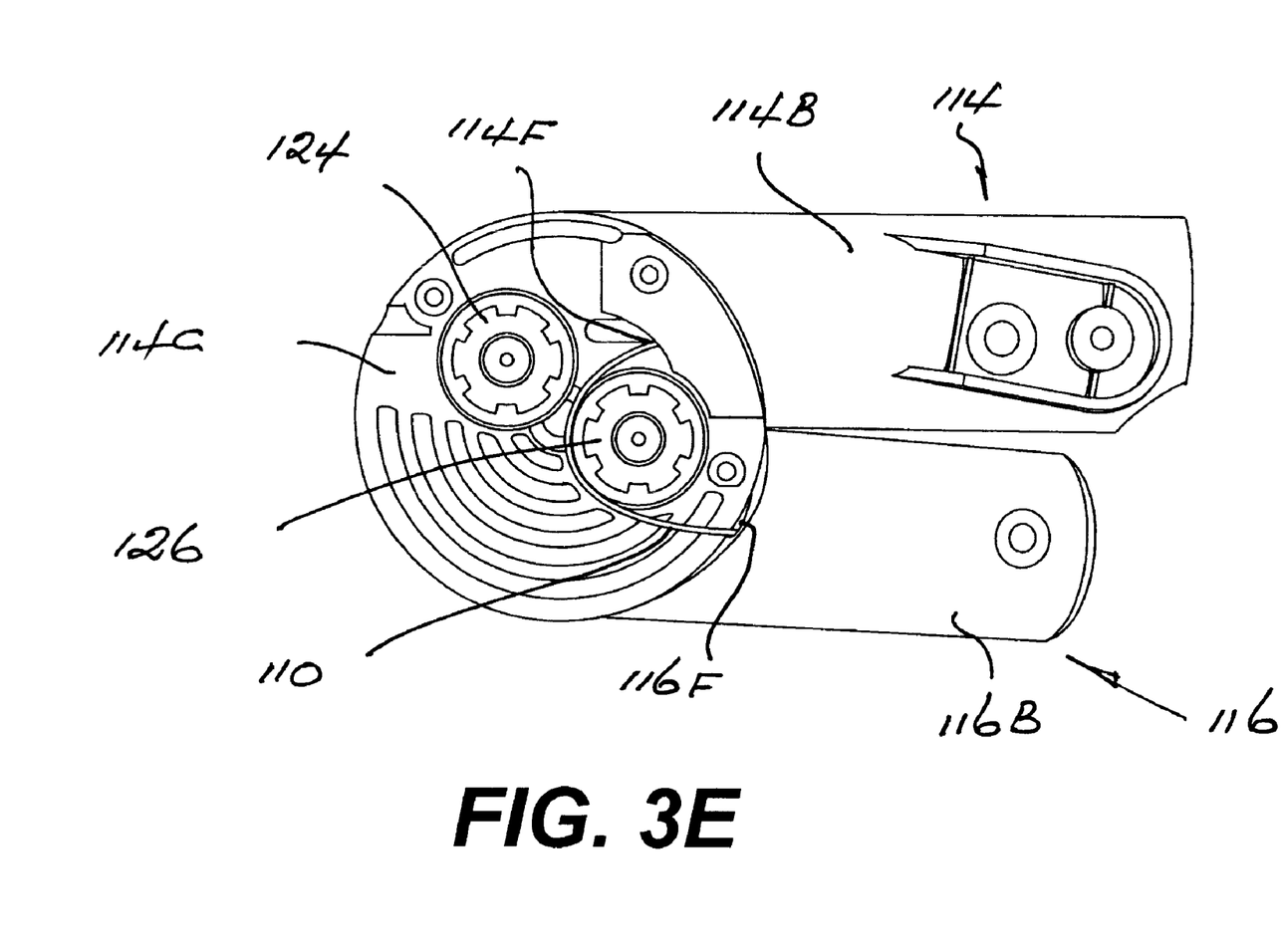

For example, when the knuckle is fully folded, as shown in FIG. 3E, described below, the cable 110 is wrapped about one of the pulleys so that any slack is taken up by the pulley, and neither slack nor excessive tension in the cable occurs. On the other hand, when the knuckle is maximally opened, as shown in FIG. 3A, described below, the cable 110 wraps serpentinely about both pulleys to absorb slack in the cable. Accordingly, irrespective of the knuckle angle, actuation of the manually operable actuator induces essentially the same amount of cable movement to retract the lock element. The present invention thus provides a stroller with both an adjustable handle bar and a reliable remotely-actuated fold mechanism.

Referring to FIG. 1, knuckle 100 is shown disposed between a handle 102 and a push arm 106 of a stroller. FIG. 1 shows the knuckle 100 of only the right-side of the stroller; however, it will be understood that, in this embodiment, a similar knuckle arrangement would be present on the left-side of the stroller. In the arrangement of FIG. 1, a reciprocal lock element 104 is disposed in one end of a push arm 106. The lock element 104 is connected to a manually operable actuator 108 via a cable. Cable 110 for the left-hand knuckle and lock element is shown extending from the left-side of the handle bar 112. In accordance with this embodiment, the cable 110 passes through the handle bar 112 to which the actuator 108 is operably mounted, through the knuckle 100, and through the hollow push arm 106. The cable 110 establishes a connection between the actuator 108 and the lock element 104 in a manner which allows the actuator 108 to be actuated (in this embodiment, rotated similar to a motorcycle throttle) and to induce the retraction of the lock element 104 back into the push arm 106. This retraction, in turn, induces the release of the lock mechanism and enables the stroller frame (not shown in full) to be collapsed. It will be appreciated that the manually operable actuator 108 can take any convenient form, such as a bicycle brake or the like.

Figure 2:
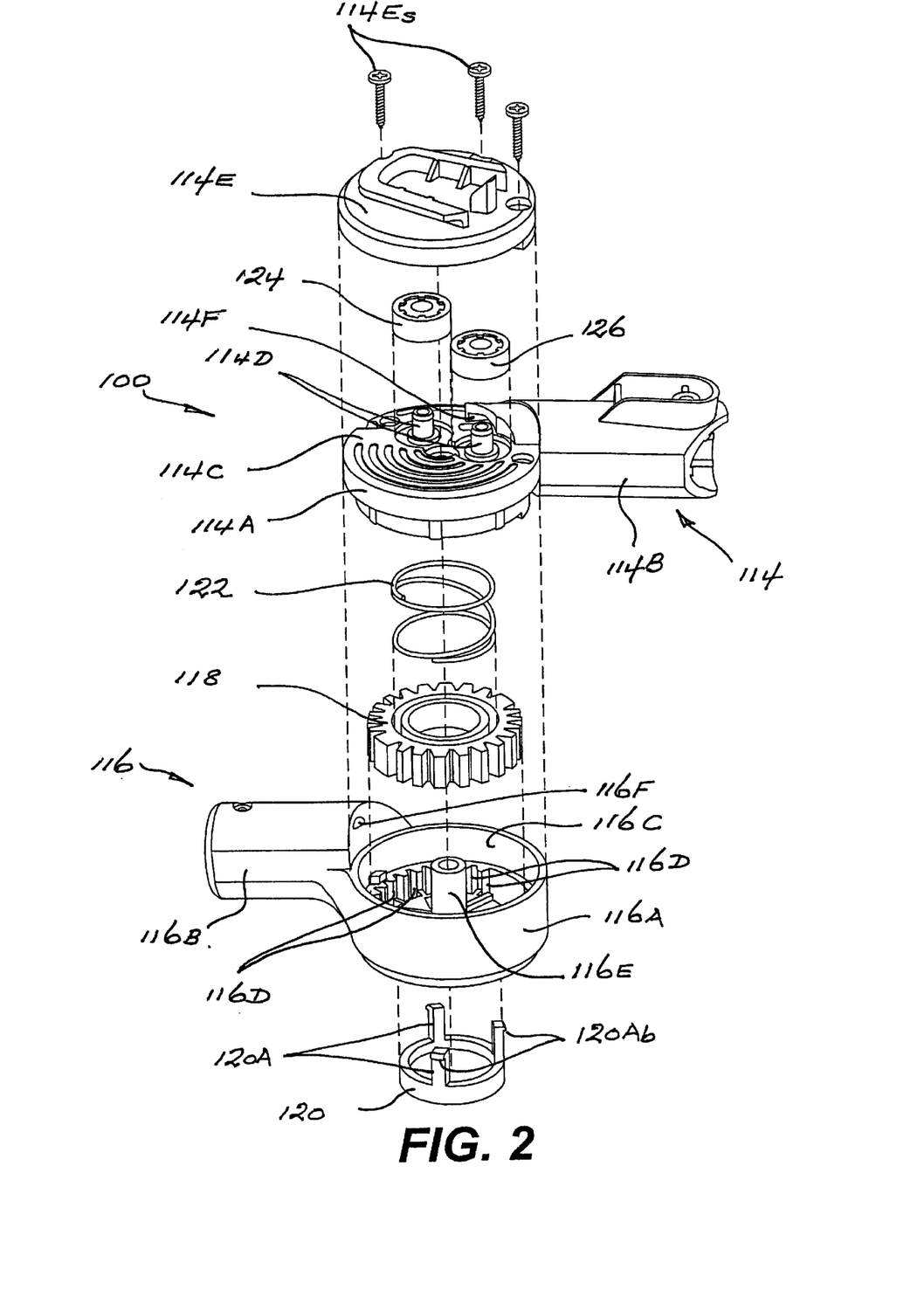
FIG. 2 is an exploded view of the knuckle shown in FIG. 1.

FIG. 2 shows the knuckle 100 in exploded form. As will be noted, this knuckle 100 includes first and second members or halves 114, 116. Both members 114, 116 are provided with circular portions 114A, 116A and tube receiving portions 114B, 116B. The tube receiving portion 116B of the second member 116 includes a cavity 116C into which a gear element 118 seats and further includes openings (not shown) through which legs 120A of a manually operable button 120, protrude. These legs 120A engage the lower face (as seen in FIG. 2) of the gear element 118 in a manner enables the gear element 118 to be displaced, against the bias of a coil compression spring 122, out of engagement with teeth 116D formed in the cavity 116C and into a corresponding cavity (not shown), which is formed in the circular portion 114A of the first knuckle member 114.

The cavity in the first member 114 also includes teeth which engage with those formed on the gear element 118. This cavity is sufficiently deep so that the gear element 118, which normally engages the teeth in both cavities simultaneously, can be displaced against the bias of the spring 122 to the degree that engagement with the teeth 116D in the cavity 116C of the second knuckle member 116 is prevented. In such an instance, the two members 114, 116 are rendered rotatable with respect to each other about an axis which is coaxial with a rivet or other fastener (not shown) that extends up through an elongate boss 116E formed in the second member 116. The gear element 118 thus effectively acts a clutch element in dog-tooth type clutch arrangement.

In the arrangement of FIG. 2, the ends of the legs 120A of the button 120 are provided with barbed portions 120Ab which engage with the interior of the circular portion 116A of the second member 116. The barbed portions 120Ab prevent the button 120 from detaching from the second member 116, while providing sufficient movement to induce the above mentioned gear disengagement to allows adjustment of the angle between the first and second knuckle members 114, 116. The head of the button 120 also encloses and conceals the head of the rivet or other fastener which connects the two knuckle members 114, 116.

The teeth on the gear element 118 and those formed in the cavities of the first and second members 114, 116, in this embodiment, are so configured that a limited number of angular positions can be established between the first and second members 114, 116. While the invention is in no way effected by the number of positions in which engagement and positional locking of the knuckle can be produced, in this embodiment, the positions are each separated by approximately 15 degrees.

The outer surface 114C of the first knuckle member 114 is provided with two studs 114D which act as supports on which two pulleys 124, 126 are rotatably disposed. In this embodiment, the pulleys 124, 126 can be made of acetal. However, as will be appreciated, the first knuckle member 114 and the studs 114D which are unitarily molded therewith, can be formed of a different material, such as nylon. There is no particular limitation on the materials which are used, those mentioned being those which are in widespread commercial use. In addition, the pulleys 124, 126 can be of equal diameter, as illustrated in the figures.

A cover 114E covers the two pulleys 124, 126 and encloses a chamber in which they are disposed. The cover 114E is, in this embodiment, secured to the first member 114 by screws 114Es. The cover 114E engages the tops of the studs 114D to retain the pulleys 124, 126 in their operative positions.

FIGS. 3A–3E show an inboard side of a left-side knuckle, i.e., a knuckle opposite the one shown in FIG. 1. These figures illustrate the interaction between pulleys 124, 126 and cable 100. As will be seen, the pulleys 124, 126 enable an appropriate length of cable 100 to be provided through the knuckle 100 and they absorb cable slack as it is produced at a plurality of different knuckle articulation angles. The first and second members 114, 116 are both provided with cable guiding structures or guides 114F, 116F to guide the cable 110 through the knuckle 100. When handle 102 is fully open and the two knuckle members 114, 116 are in the positions illustrated in FIG. 3A, the cable 110 engages the periphery of both pulleys 124, 126 in a serpentine fashion in the illustrated manner. However, as the handle 102 is folded and the handle bar 112 assumes an angle of about 15 degrees with respect to the longitudinal axis of the push arm 106, the knuckle 100 assumes the condition shown in FIG. 3B. In this position, the cable 110 begins to pull away from the upper pulley 124. When the handle bar 112 is adjusted to an angle of 30 degrees relative to the longitudinal axis of the push arm 106, the knuckle assumes another position as shown in FIG. 3C. In this position, the cable 110 is almost separated from the upper pulley 124, and the arrangement assumes a state in which the available length of the cable 110 is almost fully utilized.

FIG. 3D shows the knuckle position in which the handle 102 is rotated to an angle of approximately 45 degrees relative to the push arm 106. At this angle, referred to as the maximum path length angle, the full length of the cable 110 is utilized, and the cable 110 passes between the two pulleys 124, 126 with a minimum amount of deflection. Conversely, when the knuckle is "fully closed," which occurs when the handle 102 is rotated to a fully closed position relative to the push arm 106, such as shown in FIG. 3E, the slack, which would otherwise be generated as the knuckle folds from the position shown in FIG. 3D to that shown in FIG. 3E, is continuously taken up by the increased amount of cable 110 that becomes wrapped about approximately half of the external periphery of the lower pulley 126.

The ability of the pulleys 124, 126 to rotate about the studs 114D reduces sliding friction and therefore friction resistance, which tends to resist actuator induced cable movement and which undesirably increases the amount of force required to withdraw the lock element 104 from its locked position in the lock mechanism. For example, as shown in FIGS. 3D and 3E, the rotation of pulley 126 reduces sliding friction dramatically and thus avoids the need for increased force to operate the actuator 108.

As will be appreciated, in the present invention, the length of the cable 110 needs to be maintained at a length which is essentially equal to the maximum path length of the cable so as to ensure that no slack is produced, and no excessive tension is developed, when the first and second members 114 116 are set at the maximum path length angle. This requirement presents an assembly problem in that cable 110 cannot be drawn out of the end of the push arm 106 of the handle 102 for connection to the lock element 104. To overcome this, a process has been developed in conjunction with the above disclosed knuckle 100 to facilitate assembly of the handle 102 to the push arm 106 of the stroller.

Figure 4A:
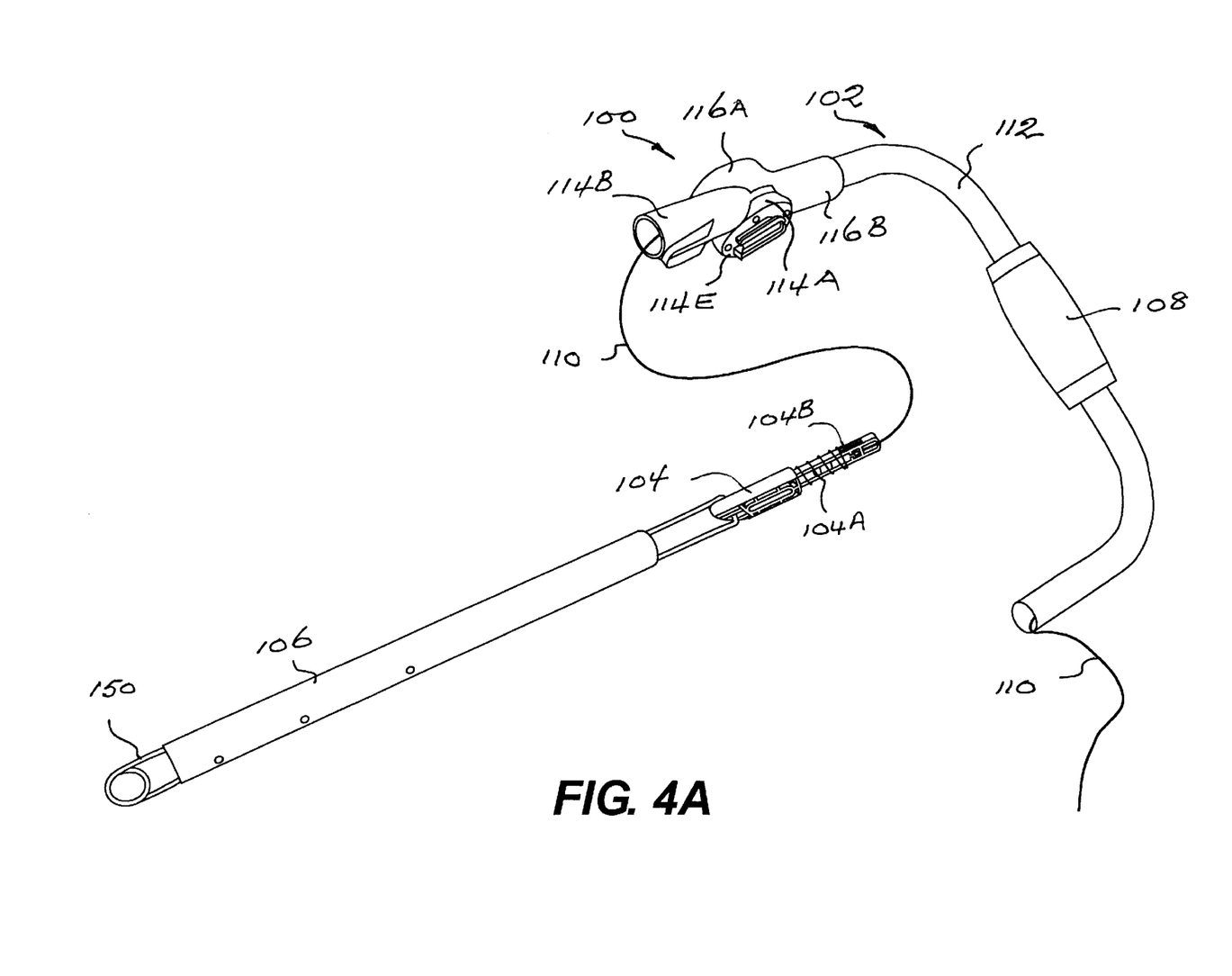
FIGS. 4A–4C are perspective views of the handle bar and a push bar of a stroller, showing an assembly technique used to locate the lock element of the lock mechanism in its required position in the push arm of the stroller.
Figure 4B:
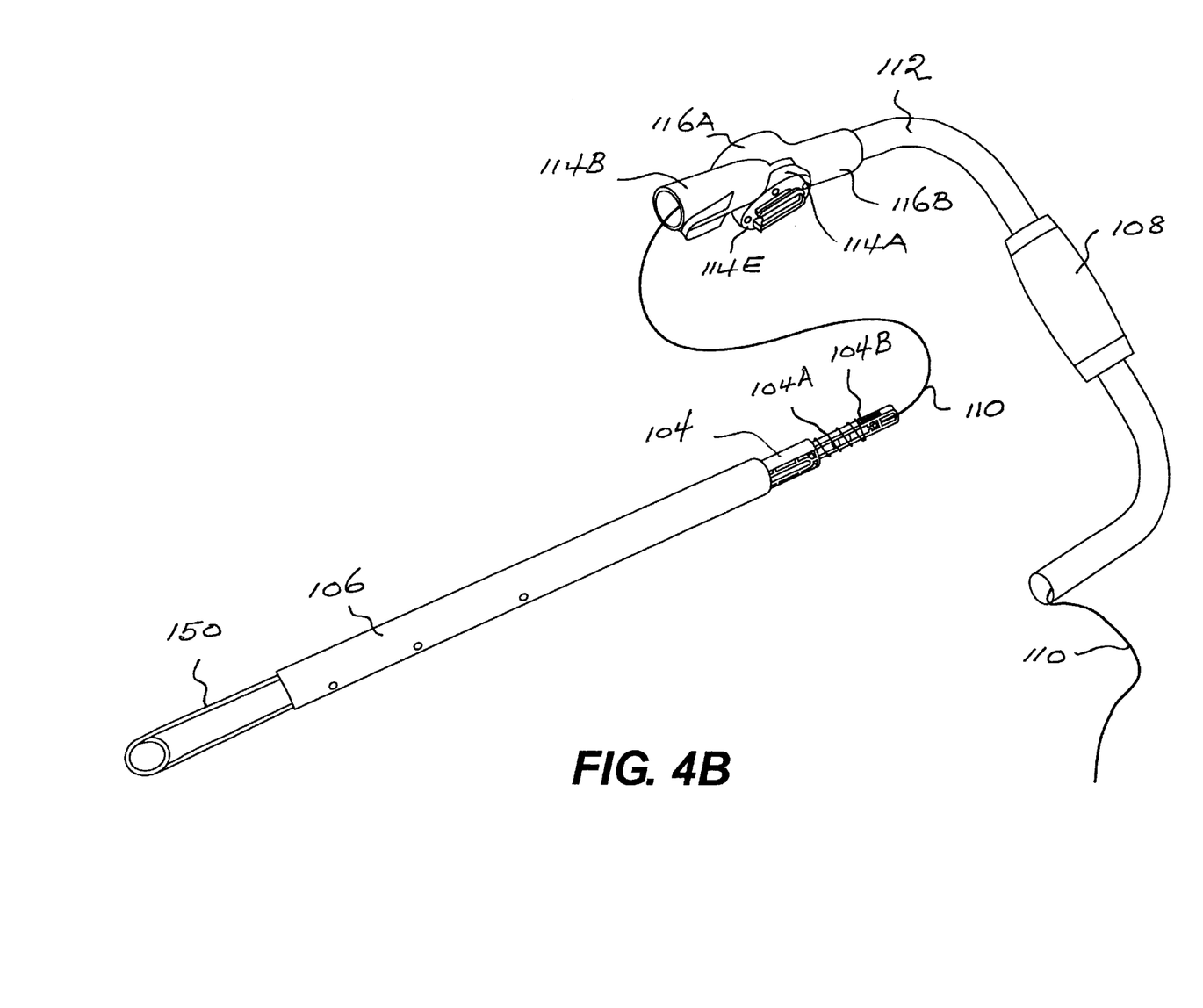
Figure 4C:
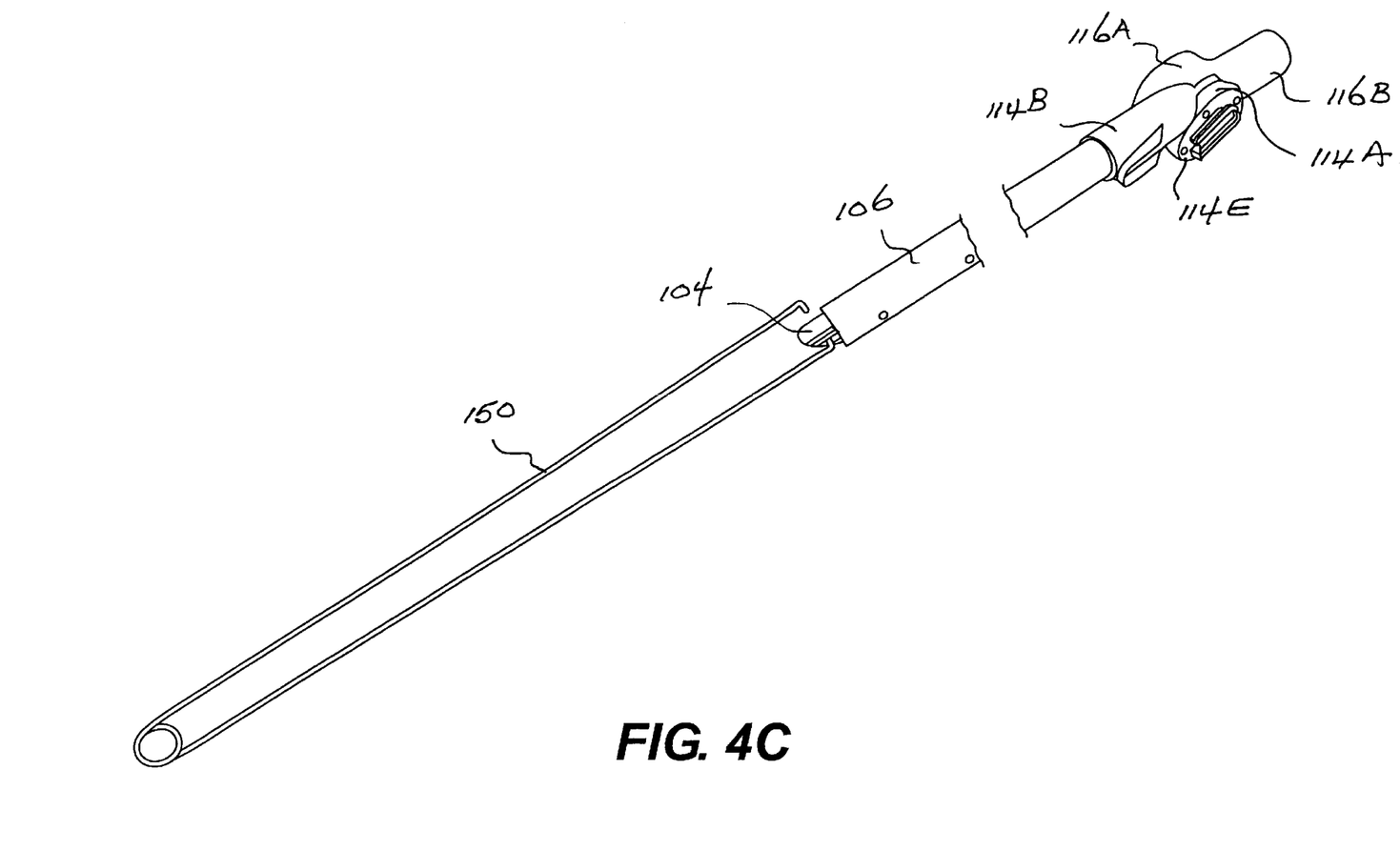

More specifically, the end of the cable 110 is connected to the lock element 104 prior to the push arm 106 being inserted into the tube receiving portion 114B of the first knuckle member 114. The lock element 104 is then gripped with a specially formed pair of tongs 150, which have been inserted through the push arm 106 in the manner illustrated in FIG. 4A. The lock element 104 is then drawn partially into the push arm 106, which is then itself inserted into the tube receiving portion 114B of the first knuckle member 114. The lock element 104 is then drawn down to its operative position, as shown in FIG. 4C, wherein a required amount of the element 104 protrudes from the lower end of the push arm 106. A spring 104A, which is disposed on the lock element 104 and is maintained in position by suitable barb elements 104B, then is engaged by an element or elements (not shown) which is/are stationary with respect to the push arm 106, so as to provide for compression of the spring 104A when the lock element 104 is drawn back into the push arm 106 by retraction of the cable 110.

Although the figures and description above describe a fold actuator 108 mounted to the center of a handle bar 112, it will be understood that the adjustable knuckle 100 of the present invention can be employed with any actuator connected by cable to a fold mechanism in which the actuator is located at a position above the knuckle 100.

An adjustable knuckle for a stroller has been described according to the present invention. Modifications and variations may be made to the adjustable knuckle for a stroller described and illustrated herein without departing from the spirit and scope of the invention. Accordingly, it should be understood that the structures described herein are illustrative only and are not limiting upon the scope of the invention.

What is claimed is:

1. An adjustable knuckle comprising:

a first knuckle member having a first cable guide;

a second knuckle member having a second cable guide, the second knuckle member being rotatable relative to the first knuckle member so that a plurality of angular positions can be established between the first and second knuckle members; and first and second cable slack absorption members disposed on the first knuckle member in first and second predetermined positions, the first and second cable slack absorption members being located and dimensioned so that a cable, passing from the first cable guide to the second cable guide, wraps thereon when an angle between the first knuckle member and the second knuckle member changes from a first angle, at which the cable passes between the first and second cable absorption members with a minimum of deflection by either of the first and second cable absorption members, to a second angle.

2. An adjustable knuckle as set forth in claim 1, wherein the first and second slack absorption members comprise first and second pulleys rotatably supported on the first knuckle member in the first and second predetermined positions, respectively, the first and second pulleys each having a periphery about which the cable wraps when the angle between the first knuckle member and the second knuckle member changes from the first angle to the second angle.

3. An adjustable knuckle as set forth in claim 1, further comprising:

a clutch mechanism operatively disposed between and interconnecting the first knuckle member with the second knuckle member and selectively locking the first and second knuckle members in a selected one of the plurality of angular positions.

4. An adjustable knuckle as set forth in claim 2, wherein the clutch mechanism comprises:

a gear element;

first gear teeth formed in the first knuckle member;

second gear teeth formed in the second knuckle member;

a spring which biases the gear element to a position wherein the gear element simultaneously engages the first gear teeth and the second gear teeth; and a manually operable button operably engaged with the gear element and adapted to transmit a manually applied force to the gear element and to move the gear element out of engagement with one of the first gear teeth and the second gear teeth.

5. An adjustable knuckle as set forth in claim 4, wherein the gear element selectively engages the first gear teeth and the second gear teeth to set the first and second knuckle members in the plurality of angular positions.

6. A stroller comprising:

a handle bar;

a push arm;

a lock element disposed in the push arm;

a manually operable actuator disposed on the handle bar;

a knuckle interconnecting the handle bar and the push arm which permits angular adjustment of the handle bar with respect to the push arm;

a cable interconnecting the manually operable actuator and the lock element, the cable passing through a portion of the knuckle and through an interior of the push arm, the cable having a length selected to permit an operative connection between the manually operable actuator and the lock element and to be essentially equal to a maximum path length between the manually operable actuator and the lock element, which occurs when an angle between the handle bar and the push bar assumes a maximum path length angle; and first and second cable slack absorption members disposed on the knuckle and arranged so that, when the handle bar and the push bar are angled at the maximum path length angle, the cable passes between the first and second slack absorption members with the minimum amount of deflection and so that, as the angle between the handle bar and the push bar changes from the maximum path length angle, the amount of cable engaging a periphery of one of first and second slack absorption members increases.

7. A stroller as set forth in claim 6, wherein the first and second slack absorption members comprise first and second pulleys which are rotatably supported on the first knuckle member.

8. A stroller as set forth in claim 6, wherein the knuckle comprises a first knuckle member having a first cable guide, and a second knuckle member having a second cable guide, the second knuckle member being rotatable with respect to the first knuckle member so that a plurality of angular positions can be established between the first and second knuckle members; and wherein the first and second slack absorption members comprise first and second pulleys rotatably supported on the first knuckle member.

9. A stroller as set forth in claim 8, wherein the knuckle further comprises:

a clutch mechanism operatively disposed between and interconnecting the first knuckle member with the second knuckle member and selectively locking the first and second knuckle members in a selected one of the plurality of angular positions.

10. An apparatus as set forth in claim 9, wherein the clutch mechanism comprises:

a gear element;

first gear teeth formed in the first knuckle member;

second gear teeth formed in the second knuckle member;

a spring which biases the gear element to a position wherein the gear element simultaneously engages the first gear teeth and the second gear teeth; and a manually operable button which is operably engageable with the gear element and adapted to transmit a manually applied force to the gear element and to move the gear element out of engagement with one of the first gear teeth and the second gear teeth.

11. A method of assembly of a stroller handle having a handle bar and a push bar connected by a knuckle which allows the angle of the handle bar to be selectively adjusted with respect to the push bar, a method of assembly comprising:

providing a manually operable actuator on the handle bar, the actuator including a cable;

feeding the cable through cable guides formed in the knuckle so that the cable passes between a pair of slack absorption members in the knuckle;

connecting an end of the cable to a lock element;

disposing a pair of tongs through a hollow of a push arm so that gripping elements of the tongs protrude out through a first end of the push arm;

gripping the lock element with the gripping elements of the tongs;

pulling the lock element into the hollow of the push arm using the tongs;

inserting the push arm into a socket formed in the knuckle; and pulling the tongs out of the push arm until a portion of the lock element protrudes from a second end of the push arm.

12. An adjustable knuckle comprising:

a first knuckle member having a first cable guide;

a second knuckle member having a second cable guide, the second knuckle member being rotatable relative to the first knuckle member so that a plurality of angular positions can be established between the first and second knuckle members; and first and second cable slack absorption members disposed on the first knuckle member in first and second predetermined positions, the first and second cable slack absorption members being located and dimensioned so that a cable, passing from the first cable guide to the second cable guide, passes between the first and second cable slack absorption members.

13. The adjustable knuckle set forth in claim 12, wherein the first knuckle member includes first and second studs on an inboard surface thereof, and the first and second slack absorption members comprise first and second pulleys mounted to the first and second studs.

14. The adjustable knuckle as set forth in claim 12, further comprising a cover mounted to the inboard surface of the first knuckle member.

15. The adjustable knuckle as set forth in claim 13, wherein the first and second pulleys are of equal diameter.

16. The adjustable knuckle as set forth in claim 12, wherein the first and second slack absorption members are located and dimensioned so that the cable contacts only one of the first and second slack absorption members at one of the angular positions and the cable contacts both the first and second slack absorption members at another of the angular positions.

* * * * *